United States Patent
Mohammed

(10) Patent No.: US 8,788,865 B2
(45) Date of Patent: Jul. 22, 2014

(54) METHOD AND SYSTEM FOR REDEPLOYING POWERED DEVICES FROM A POWER SOURCING EQUIPMENT WITH INSUFFICIENT POWER CAPACITY TO ANOTHER POWER SOURCING EQUIPMENT WITH EXCESS POWER CAPACITY

(75) Inventor: Javed P. Mohammed, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 385 days.

(21) Appl. No.: 13/177,576

(22) Filed: Jul. 7, 2011

(65) Prior Publication Data

US 2013/0013949 A1   Jan. 10, 2013

(30) Foreign Application Priority Data

May 17, 2011   (IN) .......................... 1676/CHE/2011

(51) Int. Cl.
G06F 1/00   (2006.01)
G06F 11/30   (2006.01)
G06F 1/26   (2006.01)

(52) U.S. Cl.
CPC ........................................ *G06F 1/26* (2013.01)
USPC .......................................................... 713/340

(58) Field of Classification Search
CPC ........................................................ G06F 1/26
USPC .......................................................... 713/340
See application file for complete search history.

(56) References Cited

U.S. PATENT DOCUMENTS

| | | | |
|---|---|---|---|
| 7,207,846 B2 | 4/2007 | Caveney et al. | |
| 8,386,812 B2 * | 2/2013 | Rembert et al. | ............... 713/300 |
| 2005/0272402 A1 * | 12/2005 | Ferentz et al. | ................ 455/402 |
| 2007/0110360 A1 | 5/2007 | Stanford | |
| 2008/0005433 A1 | 1/2008 | Diab et al. | |
| 2008/0214140 A1 | 9/2008 | Caveney et al. | |
| 2012/0110356 A1 * | 5/2012 | Yousefi et al. | ................ 713/320 |

OTHER PUBLICATIONS

Cisco Unified IP Phones: Conserve Energy with Intelligent Power Allocation; http://www.cisco.com/en/US/prod/collateral/voicesw/ps6788/phones/ps379/white_paper_c11-481292.html.

Sani Ronen; Technology: Maximizing The Efficiency of High-Power Power Over Ethernet; vol. 18/issue-11;Nov. 1, 2010 ; http://www.cablinginstall.com/index/display/article-displ.

* cited by examiner

Primary Examiner — Thomas Lee
Assistant Examiner — Xuxing Chen
(74) Attorney, Agent, or Firm — Milin N. Patel

(57) ABSTRACT

Example embodiments disclosed herein relate to determining power sourcing equipment. A system includes multiple power sourcing equipment that can provide power to one or more powered devices via network connections. One or more of the power sourcing equipment with excess power capacity are determined.

14 Claims, 5 Drawing Sheets

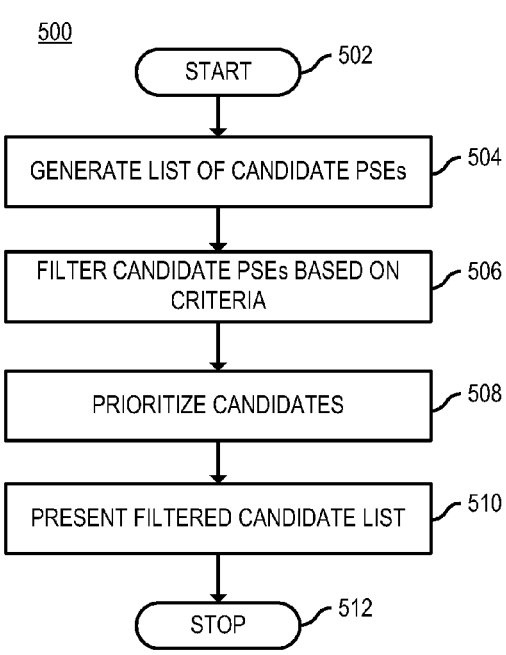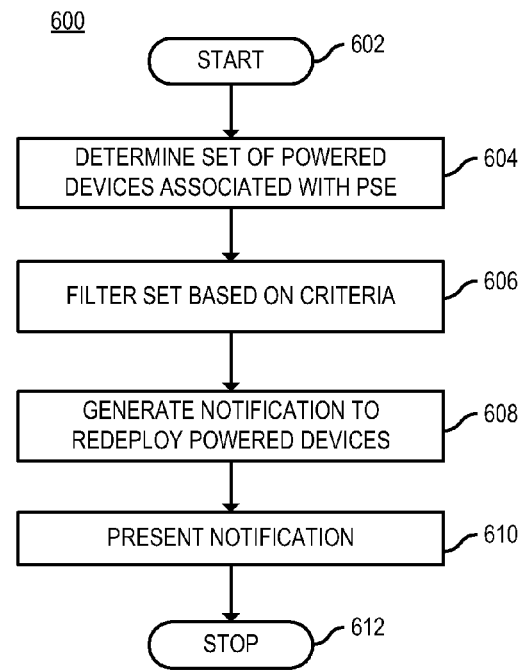
*FIG. 5*  *FIG. 6*

METHOD AND SYSTEM FOR REDEPLOYING POWERED DEVICES FROM A POWER SOURCING EQUIPMENT WITH INSUFFICIENT POWER CAPACITY TO ANOTHER POWER SOURCING EQUIPMENT WITH EXCESS POWER CAPACITY

RELATED APPLICATION

Benefit is claimed under 35 U.S.C. 119(a)-(d) to Foreign application Serial No. 1676/CHE/2011, filed in INDIA entitled "DETERMINING POWER SOURCING EQUIPMENT WITH EXCESS POWER CAPACITY" by Hewlett-Packard Development Company, L.P., filed on May 17, 2011, which is herein incorporated in its entirety by reference for all purposes.

BACKGROUND

Computing systems today are connected via various networks, for example wired networks such as Ethernet. As these networks have developed, devices have been developed that are capable of being powered via these network connections. The Institute of Electrical and Electronics Engineers (IEEE) has developed the IEEE 802.3 at standard that defines Power over Ethernet. Power over Ethernet systems involve delivering power from a Power Sourcing Equipment (PSE) to a Powered Device (PD) located at opposite ends of a network connection.

BRIEF DESCRIPTION OF THE DRAWINGS

The following detailed description references the drawings, wherein:

FIG. 5 is a flowchart of a method for generating and filtering a list of power sourcing equipment capable of supplying power to network powered devices, according to one example;

FIG. 6 is a flowchart of a method for generating a notification to redeploy network powered devices, according to one example.

DETAILED DESCRIPTION

Figure 1:
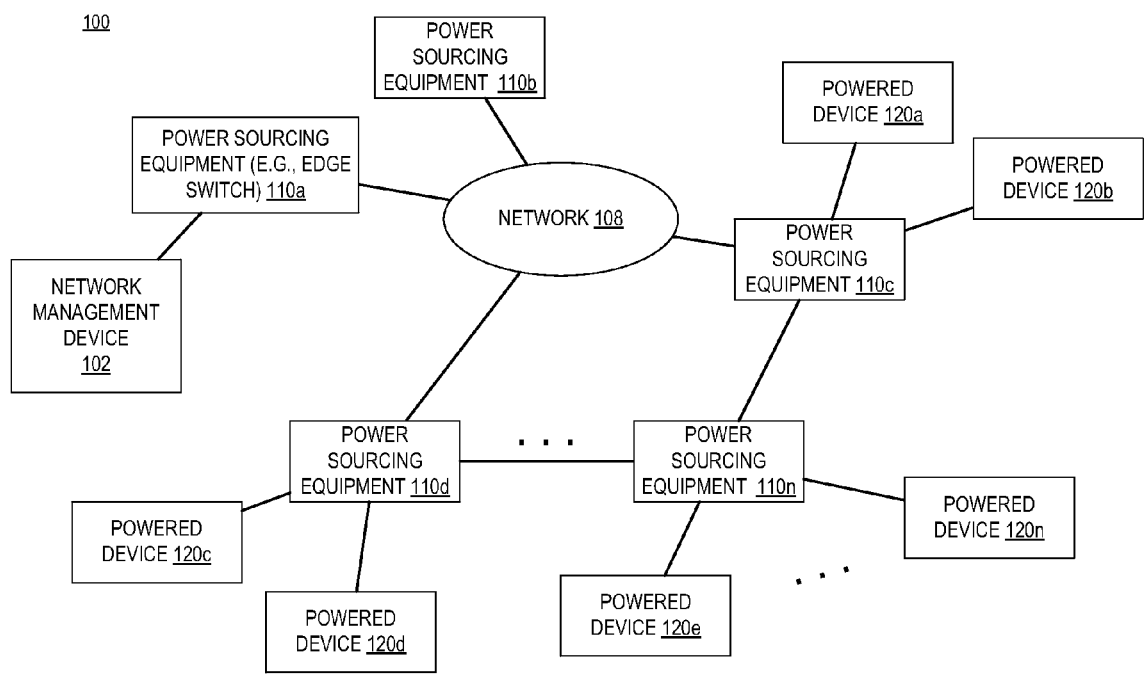
FIG. 1 is a block diagram of a system including devices powered by network elements, according to one example.

As detailed above, power can be provided from power sourcing equipment (PSE) to powered devices (PDs) via network connections. Increasingly, more and more types of devices are being developed to run as PDs powered by network connections. Standards, such as the Institute of Electrical and Electronics Engineers (IEEE) 802.3af and IEEE 802.3 at standards provide specifications to implement Power over Ethernet (PoE). The new 802.3 at standard has increased the power consumption available to devices over network connections. As such, more powered devices, such as Internet Protocol (IP) cameras, IP card readers, IP phones, wireless access points, etc., are being added to networks and consuming power. The powered devices are powered by the power sourcing equipment. However, as more and more powered devices are connected to power sourcing equipment, such as network switches or hubs, power sourcing equipment providing power to its powered devices can become oversubscribed or otherwise unable to provide sufficient power to its powered devices. As such, the power sourcing equipment may enter into a "fault" state resulting in some or all of the connected powered devices to be unable to draw power, receiving insufficient power, or receiving intermittent power. This can lead to the powering down of the powered devices and/or the power sourcing equipment. The downtime caused by the powering down of the devices can be interruptive to consumers of the devices as well as service providers using the devices.

When downtime occurs, a network administrator would redeploy the power sourcing equipment and/or powered devices to balance power supply usage. To do this, the network administrator would want to know information about the power sourcing equipment in the system, power consumption information about each power sourcing equipment, topological distances between devices, or other like information. However, it is difficult for a network administrator to know the power capabilities of each of the network devices. Difficulties can arise from the network administrator not being familiar with the devices, from a large number or network devices present, from faulty information or assumptions used by the administrator, etc. Further, in certain network systems, multiple administrators may manage portions of the network so that an individual administrator has inadequate information to make an informed decision to redeploy network devices.

Accordingly, various embodiments disclosed herein relate to an approach for managing the deployment of powered devices and power sourcing equipment. The system can identify power sourcing equipment that may be strained or oversubscribed at a network management device. Further, the network management device can identify potential power sourcing equipment in the network that can act as a substitute for the strained power sourcing equipment that can provide power to one or more of the powered devices of the strained power sourcing equipment. Determining strained power sourcing equipment and substitutes can reduce any service downtime of the devices powered by the strained power sourcing equipment. Further, the network management device can be utilized to identify and help plan approaches to deploy other network elements throughout the system.

FIG. 1 is a block diagram of a system including devices powered by network elements, according to one example. The system 100 can include a network management device 102 connected via a network 108 to power sourcing equipment 110a-110n and powered devices 120a-120n. The power sourcing equipment 110 and the powered devices 120 can be considered part of the network 108 or the power sourcing equipment 110 and the powered devices 120 can be considered part of another network that is connected, at least in part, via the network 108. In one example, the power sourcing equipment 110 can include one or more edge switches or hubs that are part of the network 108. In certain examples, an edge switch is a computer networking device that connects network segments, where at least one of the network segments connects to a device (e.g., a powered device 120) to provide the device to access the network 108.

The network 108 can utilize wired communications (e.g., connections to computing devices), wireless communications (e.g., the connection to wireless communication devices), or combinations thereof. Further, the network 108 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc.

The power sourcing equipment 110 can be considered network elements of the system 100. In certain embodiments, a network element is a logical entity that unites one or more physical devices. Examples of network elements include hubs, switches, routers, etc. Further, in certain embodiments, power sourcing equipment 110 are network elements that provide power via a network connection (e.g., corresponding to the PoE standard) to powered devices 120.

In certain embodiments, the network powered devices 120 are devices that are powered by power sourcing equipment 110 of the system 100 via network connections. Examples of powered devices 120 include IP cameras, IP card readers, IP phones, wireless access points, computing devices, and media devices. Some or all of the powered devices 120 can come from one or more power sourcing equipment 110. For example, a network powered device 120 may receive power from two power sourcing equipment 110 via respective network connections. In a PoE system, the power can be supplied via differential pairs of wires found in Ethernet cables.

With this approach, network elements (e.g., power sourcing equipment 110) can provide power to a subset of the network powered devices 120 via respective network connections. For example, PSE 110c can provide power to powered devices 120a and 120b while PSE 110d provides power to powered devices 120c and 120d, and PSE 110n provides power to powered devices 120e-120n.

The powered devices 120 can have various power usages depending on the type of powered device 120 and/or a state of the powered device. For example, some powered devices 120 draw a constant level of power while other powered devices 120 have power requirements that may vary depending on conditions associated with powered device 120 and/or usage of the powered device 120. As such, it can be easier to estimate power supply requirements for powered devices 120 that have constant or near constant power usage. A powered device 120 with varying power usage brings more dynamics from the management prospective. For example, a pan-tilt-zoom camera when in a normal usage mode may consume close to constant power. However, if the camera changes to a state using the pan or tilt feature, it may consume much more power because a motor may be driven for changing the camera to that view. To provide dynamic management guidance, the network management device 102 can assimilate power usage information from various power sourcing equipment 110 and/or powered devices 120 to provide an intelligent mechanism to aid a network administrator in planning deployment of the power sourcing equipment 110 and/or powered devices 120. Power usage information for a power sourcing equipment 110 can include, for example, an attribute indicating a threshold (e.g., a maximum, a maximum safe to utilize, etc.) power available for powered devices 120, a power consumed by the powered devices 120, a number of powered devices connected to the power sourcing equipment 110, a number of free ports available at the power sourcing equipment 110, information that can be used to generate this information, or a combination thereof.

Figure 3:
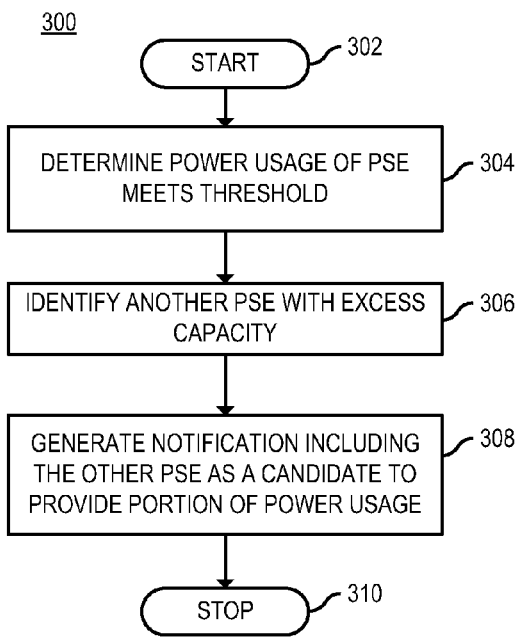
FIG. 3 is a flowchart of a method for generating a notification to facilitate deployment of power sourcing equipment, according to one example.

An equipment manager of the network management device 102 can identify a PSE 110n that is approaching its power sourcing capacity using the power usage information, for example, as detailed in the description of FIG. 3. Then, the network management device 102 can determine whether the power sourcing capacity usage is recurring. The recurrence of the power usage can indicate that the power usage is not just an anomaly, but a genuine problem.

Once it is determined that the power sourcing equipment 110 is in a state which meets one or more of these conditions, a capacity identifier module of the network management device 102 can determine a list of network elements (e.g., other power sourcing equipment) with a power supply usage below a particular threshold. In certain embodiments, power supply usage is based on the amount of energy per unit of time used by the power sourcing equipment 110. Moreover, the threshold can be used to determine which power sourcing equipment 110 has sufficient capacity to alleviate the demand for power on PSE 110n. This can be accomplished by comparing the power supply usage with the threshold.

Different types of thresholds can be used. In one example, the threshold can be based on a percentage or ratio of used or available power supply capacity associated with the power sourcing equipment 110. In another example, the threshold can be based on a power sourcing capability of the power sourcing equipment 110. For example, if the maximum power sourcing capability of the power sourcing equipment 110 is 100 watts, the threshold may be 60 watts being utilized on average. This can be used to ensure that the power sourcing equipment 110 has sufficient power supply to adequately serve powered devices 120.

A notification module of the network management device 102 generates a notification including the list as possible candidates to deploy a powered device 120. In certain scenarios, the list of possible candidates is triggered based on the determination by the equipment manager that power supplied by the PSE 110n is above another threshold level. By way of example, the PSE 110n may have a maximum power sourcing capacity of 100 watts, while having a safe usage level threshold of 75 watts. When the safe usage level threshold is met or met for a requisite recurring amount of times, the process is triggered for powered devices 120e-120n of the PSE 110n. As such, a subset of the powered devices 120e-120n of the PSE 110n can be redeployed to one of the possible candidates. In other scenarios, the list of possible candidates can be triggered based on a request from a network administrator to determine which one of the power sourcing equipment 110a-110n the administrator should deploy the powered device 120. The notification can be in the form of a message, an electronic mail, a graphical or textual display presentation, a combination thereof, or the like.

The list can also be filtered using a filtering module of the network management device 102. For example, the list can be filtered based on spatial criteria, capability criteria, utilization criteria, or a combination thereof as further detailed in the description of FIG. 5. The purpose of the filtering can be to narrow down the possible candidates based on the criteria to facilitate a network administrator's selection of a candidate to utilize to deploy the powered device 120. The criteria can further be utilized to prioritize candidates.

In one example, a spatial criterion is used to determine how far away a candidate power sourcing equipment 110 is from the identified PSE 110n. The network management device 102 can include information regarding the topology of the system 100. For example, the network management device 102 can include information as to which power sourcing equipment 110 is in the same room, same building, same aisle, same segment of a room, etc. Further, the network management device 102 can include information of a room as a grid pattern or assigning particular location information to track the location of each device. This information can be assigned when a power sourcing equipment is deployed. As such, a rating or score of how close a candidate power sourcing equipment 110 is to the identified PSE 110*n* can be determined or assigned. This score or rating can be used in the filtering and/or prioritization. For example, candidate power sourcing equipment 110 below a particular threshold can be filtered out of the list or candidates with closer spatial scores can be prioritized ahead of other candidates. Further, the candidates can be filtered based on whether an existing network link exists between one or more of the powered devices 120*e*-120*n* of the PSE 110*n* and the location of the candidate power sourcing equipment 110.

In certain examples, the powered devices can be in different locations than the power sourcing equipment. For example, in the case of a corporate setting with IP cameras for security, the IP cameras can be distributed throughout a building while the power sourcing equipment can be in one or more network rooms. As such, some power sourcing equipment 110 of the system 100 may not have a direct link to some of the powered devices 120.

In another example, the capability criteria is used to determine whether the power sourcing equipment 110 that are potential candidates are capable of powering one or more of the powered devices 120*e*-120*n* of the identified PSE 110*n*. For example, some power sourcing equipment 110 may not have sufficient power via a single port to power particular powered devices 120 that might be redeployed to the potential candidate. This can occur, for example, because the power sourcing equipment 110 is older and/or associated with a different specification of power supplying, for example, pre-standard network elements and/or network elements supporting proprietary PoE protocols.

In yet another example, the utilization criteria is used to determine how much power the potential power sourcing equipment 110 has available. This can be described as a number, score, rating, etc. based on how much power is available for supply usage. This number can be based on a safe threshold value and a currently used value (e.g., an average currently used power value). The safe threshold value and/or the currently used value can be received by the network management device 102 from the potential power sourcing equipment 110. In one example, a potential power sourcing score may be the difference in value from the safe threshold value and the currently used value. The safe threshold value can be a value based on testing of the potential power sourcing equipment 110.

Figure 2A:
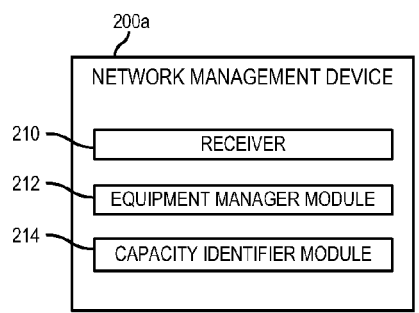
FIGS. 2A and 2B are block diagrams of devices for managing deployment of network elements, according to various examples.
Figure 2B:
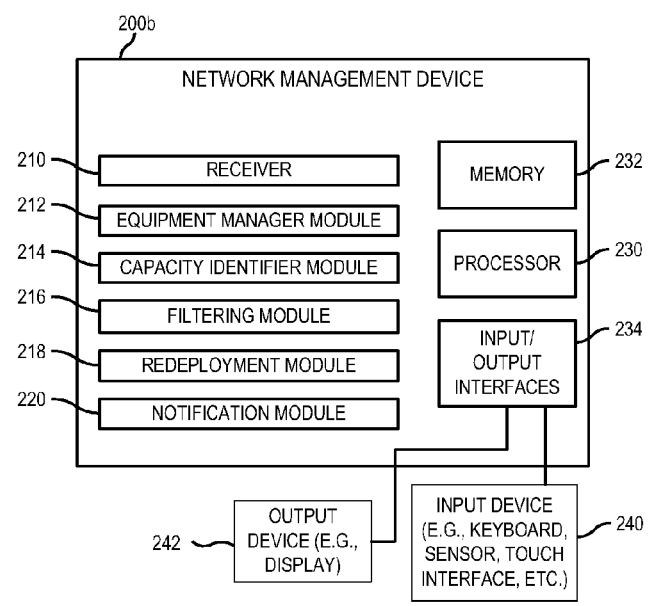

FIGS. 2A and 2B are block diagrams of devices for managing deployment of network elements, according to various examples. Network management devices 200*a*, 200*b* include components that can be utilized to determine power sourcing equipment that includes excess power capacity to power a network powered device. The respective network management devices 200*a*, 200*b* may be a notebook computer, a desktop computer, a tablet computing device, a wireless device, a server, a workstation, or any other computing device that is capable of determining power sourcing equipment with excess power capacity.

A receiver 210 of the network management device 200 receives status information about multiple power sourcing equipment of a system including power sourcing equipment and powered devices. The network management device 200 can communicate with entities that it manages (e.g., network elements) using one or more protocols, such as Simple Network Management Protocol (SNMP), Telnet, etc. to retrieve status information. The status information can include attributes such as temperature, firmware version, traffic statistics, etc. In addition to this information, status information about a network element, such as a power sourcing device can include a threshold power available value (e.g., a maximum PoE power available value), a power supply used value (e.g., a consumed PoE value), a number of powered devices connected, the number of PoE ports to which no powered device has yet been connected, or a combination thereof.

The network management device 200 can poll the power sourcing equipment for the status information. Moreover, the network management device 200 can receive the status information separately from the power sourcing equipment. Status information received from a power sourcing equipment can be in the form of aggregated information, processed information, raw data, or a combination thereof. For example, the status information can include an average power supply used value.

The equipment manager module 212 selects one of the power sourcing equipment providing power to multiple powered devices via respective network connections. The selection can be based on the received status information. The selection can be for determining a power sourcing equipment that should be deleveraged by redeploying one or more of its associated powered devices to another power sourcing equipment. For example, if the status information indicates that the selected power sourcing equipment is close to or at a threshold limit to where the selected power sourcing equipment may not be capable of satisfying the power needs of the powered devices connected to it.

In one embodiment, the status information includes a used power consumption level associated with the selected power sourcing equipment. In this embodiment, the used power consumption level is a current or average value of the power used by the power sourcing equipment and/or the power supplied to the powered devices. The selection of the power sourcing equipment can be based on a determination by the equipment manager module 212 that the used power consumption level meets or exceeds a threshold power capacity. The threshold can be set by the network administrator, set based on the type of power sourcing equipment and/or its capabilities, or the like. The threshold power capacity can be, for example, a safe limit of power that can be used or supplied, a percentage of the maximum amount of power that can be used or supplied, or the like. Thus, in one example, the inquiry used to determine the selection of the power sourcing equipment is whether the percentage of used power over the maximum rating of the power sourcing equipment is greater than a usage threshold of 80 percent of the maximum power that the power sourcing equipment is rated for. If this is the case, the power usage of the power sourcing equipment has exceeded the usage threshold and indicates that it is approaching or has reached a particular capacity of the power sourcing equipment. In one embodiment, if the threshold is met, the power sourcing equipment is selected.

In another embodiment, if the threshold is met, a counter is incremented. The equipment manager module 212 can maintain a count of how many times the used power consumption level meets or exceeds the threshold power capacity. In this case, the selection of the power sourcing equipment can be based on a comparison of the count and a count violation threshold. This count can be included in the status information or be determined at the network management device. In certain embodiments, a violation threshold represents a count value that reflects that power usage of the power sourcing equipment is recurring. Further, the violation threshold can be set by an administrator. The use of the count comparison allows for the administrator to be ensured that the power usage of the power sourcing equipment is not an anomaly, but is recurring and should be addressed. As such, if the comparison is made and the count meets or exceeds the violation threshold, the power sourcing equipment is selected. As such, the selection of the power sourcing equipment can be based on the comparison of the count and the violation threshold.

Once a power sourcing equipment is selected, other power sourcing equipment is identified to take on some of the powered devices of the selected power sourcing equipment. A capacity identifier module 214 can determine another one of the power sourcing equipment that includes excess power supply. This identified power sourcing equipment can be presented to the administrator as a candidate to redeploy one or more of the powered devices of the selected power sourcing equipment to.

Challenges that arise in selecting the other power sourcing equipment include determining that the other power sourcing equipment can not only sustain its existing load, but can also take on additional load from the selected power sourcing equipment. Thus, the capacity identifier module 214 determines a set of the power sourcing equipment in the system, based on the status information, with excess capacity. Power sourcing equipment with excess capacity, in certain examples, is power sourcing equipment where power utilization is less than a threshold value associated with a safe usage of the power sourcing equipment. Utilization can be, for example, a ratio of a power consumed or sourced by the power sourcing equipment to a maximum threshold value associated with the power sourcing equipment. The utilization can be compared with a safe utilization capacity parameter or variable that can be used by an administrator or be preset to indicate that there is additional capacity left at the power sourcing equipment to take on another powered device. Even though the capacity determination is showed as a ratio in this example, it is noted that the information and/or status used in the determination of excess capacity can also be usage numbers (e.g., a power used or supplied by the power sourcing equipment compared to a threshold value of a safe power capacity of the power sourcing equipment). The set can include the other power sourcing equipment and/or additional power sourcing equipment.

The set of power sourcing equipment may then be filtered by a filtering module 216. In one example, the filtering module 216 filters the set based on respective spatial relationships between the selected power sourcing equipment and the power sourcing equipment of the set. The filtering module 216 filters the set based on topological knowledge of the closest capable neighbors of the selected power sourcing equipment. In a practical setup, the filtering can be based on various criteria, for example, filtering can be based on the power sourcing equipment being in the same facility, in the same network room, in the same network aisle or column, etc.

The network management device 200 can discover the power sourcing equipment it manages by leveraging one or more discovery protocols, such as Link Layer Discovery Protocol (LLDP), Cisco Discovery Protocol (CDP), etc. A fundamental principle used for discovery and/or filtering based on closest capable neighbor can be based on the physical links between network elements (e.g., the power sourcing equipment). The closest neighbors may be network elements that are physically connected or connected via the least amount of hops. Further, power sourcing equipment of the set may be filtered if the power sourcing equipment is in a different subnet than the selected power sourcing equipment.

Moreover, the filtering module 216 can filter the set or further filter the set based on other criteria. In one example, a quantity of excess power capacity of the respective power sourcing equipment of the set is used for filtering. The excess power capacity can be determined in raw power (e.g., an excess X value of watts available) or based on a ratio (e.g., an excess Y percent of load free). In another example, relationships between the devices being powered of the selected power sourcing equipment and the other power sourcing equipment of the set can be used for filtering. For example, if the powered devices associated with the selected power sourcing equipment is a particular type of device (e.g., IP phones), the set can be filtered to determine if there is neighboring power sourcing equipment with that type of powered device and/or exclusively powering that type of device. In one example, having similar types of devices connected to a power sourcing equipment can facilitate deployment of policies based on a type of powered device. For example, a policy to save power by turning off a particular type of powered device at a given time (e.g., turning off the powered devices at night). Thus, by grouping together similar powered devices, the policy would need to be applied to a lesser number of network power sourcing devices. Further, in certain scenarios, the filtering module 216 can prioritize the set rather than filtering the set by providing scores or ratings to the set and then ordering the set.

A redeployment module 218 can be used to select one or more of the powered devices of the selected power sourcing equipment to redeploy to one of the power sourcing devices of the set or filtered set based on criteria or a set of rules. These victim powered devices can then be moved to one or more of the other power sourcing equipment with excess capacity. In certain examples, a victim powered device is a powered device of the selected power sourcing equipment that is selected to be powered by another power sourcing equipment.

In one example, criteria are based on the amount of power consumed by the powered devices. As such, a rule can be set so that the highest consuming powered device is selected to be a victim. This allows for a quick reduction in consumption of power in the selected power sourcing equipment, which can be considered over-subscribed.

In another example, the criteria can be based on similarities of the candidate victim powered devices with the powered devices associated with the other power sourcing equipment. The powered device can be selected based on its type, which can represent its functionality. For example, if the selected power sourcing equipment has IP phones and wireless access points and the other power sourcing equipment has IP phones, it can be beneficial to redeploy the IP phones to the other power sourcing equipment. As previously noted, this approach can be used to facilitate deployment of policies.

In yet another example, the criteria can be based on the amount of impact of downtime of the powered devices. For example, ratings can be given to each powered device (e.g., based on type) to show how important it is to minimize downtime or to the network infrastructure. As such, powered devices selected as victims can be the powered devices with lower ratings. For example, provided the choice between an IP phone and an access point, the IP phone can be selected because it will likely impact one user, while the access point will likely impact multiple users. These ratings can vary based on what is considered important for the particular situation.

A notification module 220 can be used to provide the set of power sourcing equipment to an administrator. In one example, the set can be provided as a raw list, a filtered list, a prioritized list, or a combination thereof. Additionally, the notification module 220 can generate a notification that one or more powered devices of the selected power sourcing equipment should be redeployed. Further, the notification can include recommendations of which powered devices to be redeployed.

In another example, the set can be provided in a graphical manner. For example, the notification module 220 can generate a graphical map view of the candidate power sourcing equipment. The candidate power sourcing equipment can be annotated with status information as well as other power information, such as power availability, power consumption, power utilization, or the like. This can provide a network administrator with a visualization of the status of the system to allow the administrator to choose a candidate power sourcing equipment. Further, the topology of the system can be set up at the network management device 200. For example, when a network element or powered device is added, information about the location of the network element can be provided. This information can then be used to generate the graphical view.

In certain scenarios, the capacity identifier module 214 and the redeployment module 218 can serve the function to deploy new powered devices. For example, when a network administrator of the system wishes to deploy a new powered device, the network administrator can provide a request to the network management device 200 to find power sourcing equipment to power it. The capacity identifier module 214 can then identify a set of potential candidate power sourcing equipment. Then, the filtering module 216 can filter the set based on criteria determined by the network administrator. The notification module 220 can then be used to provide the network administrator with one or more candidate power sourcing equipment.

A processor 230, such as a central processing unit (CPU) or a microprocessor suitable for retrieval and execution of instructions and/or electronic circuits can be configured to perform the functionality of any of the modules 212-220. In certain scenarios, instructions and/or other information, such as status information, can be stored in memory 232 or other memories. Input/output interfaces 234 may additionally be provided by the network management device 200b. For example, input devices 240, such as a keyboard, a sensor, a touch interface, a mouse, a microphone, etc. can be utilized to receive input from an environment surrounding the network management device 200b. Further, an output device 242, such as a display, can be utilized to present information to users. Examples of output devices include speakers, display devices, amplifiers, etc. Moreover, in certain embodiments, some components can be utilized to implement functionality of other components. Additionally, the receiver, a transmitter, and/or other types of communications modules can be connected to the network management device 200b via the input/output interfaces 234. Communications can include network communications. As such, the input/output interfaces 234 can communicate via network connections to other devices.

Each of the modules 212-220 may include, for example, hardware devices including electronic circuitry for implementing functionality. In addition or as an alternative, each module 212-220 may be implemented as a series of instructions encoded on a machine-readable storage medium of network management device 200b and executable by processor 230. It should be noted that, in some embodiments, some modules are implemented as hardware devices, while other modules are implemented as executable instructions.

FIG. 3 is a flowchart of a method for generating a notification to facilitate deployment of power sourcing equipment, according to one example. Although execution of method 300 is described below with reference to network management device 200b, other suitable components for execution of method 300 can be utilized (e.g., network management device 200a, computing device 700, etc.). Additionally, the components for executing the method 300 may be spread among multiple devices. Method 300 may be implemented in the form of executable instructions stored on a machine-readable storage medium, and/or in the form of electronic circuitry.

Method 300 may start in 302 and proceed to 304, where network management device 200b determines that power usage of one of multiple power sourcing equipment 110 providing power via network connection to powered devices 120, meets a threshold level. Each of the power sourcing equipment 110 can be connected to and power one or more powered devices 120. Further, certain power sourcing equipment, e.g., power sourcing equipment 110b, may not be powering any powered devices 120, but is capable of powering devices via network connection.

The power usage determination can be based status information received from the power sourcing equipment 110. In one example, power usage statistics of the power sourcing equipment 110 can be polled by the network management device 200b or be received via another communication mechanism (e.g., push notification). For example, the power sourcing equipment 110 can provide statistics based on a trigger (e.g., a determination that the power sourcing equipment 110 meets the threshold). Statistics received from one of the power sourcing equipment (e.g., PSE 110n) can include power usage information. In various examples, the statistics can include a rated (e.g., maximum) PoE power available, consumed PoE power, a number of powered device connected to the PSE 110n, free ports available at the PSE 110n, or a combination thereof. The threshold level can be based on the rated PoE power available or be another level set by the administrator. Moreover, the consumed PoE power can be an instantaneous value or a processed value, such as an average, highest level over a time period, or the like. If the threshold level is met, it can be an indication that the PSE 110n is oversubscribed and one or more of its powered devices 120e-120n should be redeployed to other power sourcing equipment 110.

At 306, the capacity identifier module 214 identifies another one of the power sourcing equipment (e.g., PSE 110d) with excess capacity to provide power to one or more of the powered devices 120e-120n. The determination of excess capacity can be based on whether the power usage of the PSE 110d is less than another threshold power level as further detailed in the description of FIG. 4. In certain scenarios, the identification of the other PSE 110d is further based on a spatial relationship between the power sourcing equipment 110d, 110n. For example, the network management device 200b can determine a spatial relationship between the determined PSE 110n and other power sourcing equipment that may have excess capacity. The power sourcing equipment with the closest spatial relationship can be selected to facilitate redeployment of powered devices. As noted above, one or more other criteria can be used to select or identify the power sourcing equipment.

Once the other PSE 110d is identified, the notification module 220 of the network management device 200b generates a notification including information that the other PSE 110d is a candidate to provide a portion of the power usage of the determined PSE 110n to its powered devices 120e-120n (at 308). Providing the power can be accomplished by redeploying one or more of the powered device 120e-120n to be powered and connected via the other PSE 110d. The notification can be an electronic mail message sent to a terminal that can be viewed by a network administrator, a popup window in a terminal, a log notification message, or the like. Then, at 310, the method 300 stops. The network administrator or another user receiving the notification can then redeploy one or more of the powered devices 120e-120n to the other PSE 110d.

Figure 4:
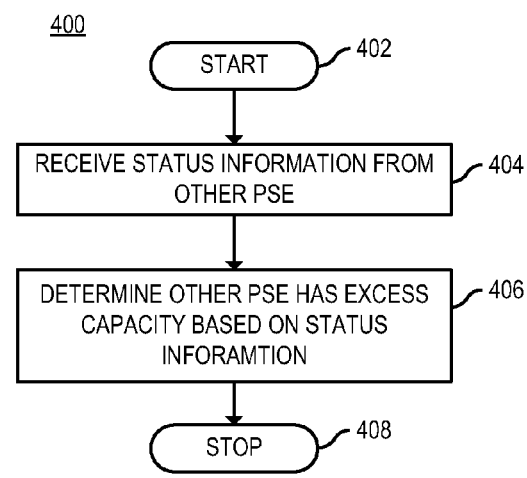
FIG. 4 is a flowchart of a method for determining power sourcing equipment capable of providing power to network powered devices, according to one example.

FIG. 4 is a flowchart of a method for determining power sourcing equipment capable of providing power to network powered devices, according to one example. Although execution of method 400 is described below with reference to network management device 200b, other suitable components for execution of method 400 can be utilized. Additionally, the components for executing the method 400 may be spread among multiple devices. Method 400 may be implemented in the form of executable instructions stored on a machine-readable storage medium and/or in the form of electronic circuitry.

Method 400 may start at 402 in a state where a PSE 110n is determined to be oversubscribed. The method 400 may then proceed to 404, where a receiver 210 of the network management device 200b receives status information from other power sourcing equipment 110 including PSE 110d. The status information from PSE 110d can include a power level available value and a consumed power level. Further, the status information from PSE 110d can include the number of available network connection ports of PSE 110d. This information can be used to determine if the PSE 110d has excess capacity.

At 406, the capacity identifier module 214 of the network management device 200b determines that PSE 110d has the excess capacity to provide power. This can be based on the status information. For example, the PSE 110d can have excess power capacity if the power level available value is greater than the consumed power level of the PSE 110d. Further, the determination can be based on how much excess power capacity the PSE 110d has as noted above. Moreover, the determination can be based on the ability of the PSE 110d to supply power to one or more of the powered devices 120e-120n. This can be based on the availability of connection ports that can be used to connect powered devices 120 to the PSE 110d. Method 400 stops at 408. The network management device 200b can utilize the identification of the PSE 110d in other processes.

FIG. 5 is a flowchart of a method for generating and filtering a list of power sourcing equipment capable of supplying power to network powered devices, according to one example. Although execution of method 500 is described below with reference to network management device 200b, other suitable components for execution of method 500 can be utilized. Additionally, the components for executing the method 500 may be spread among multiple devices. Method 500 may be implemented in the form of executable instructions stored on a machine-readable storage medium, and/or in the form of electronic circuitry.

Method 500 may start in 502 in a state where the network management device 200b is requested to generate a list of power sourcing equipment. The request can come from an administrator or be triggered by another process of the network management device 200. At 504 the network management device 200b may generate a list of candidate power sourcing equipment to deploy one or more powered devices. Power sourcing equipment of the system send status information to the network management device 200b. A receiver 210 of the network management device 200b receives the status information from the power sourcing equipment to determine the list. In certain embodiments, a power sourcing equipment is considered a candidate if the power sourcing equipment is capable of supplying power to a powered device via an unused port of the power sourcing equipment. A capacity identifier module 214 generates the list of candidates by identifying the capable power sourcing equipment based on the status information.

Then, at 506, the filtering module 216 filters the candidate power sourcing equipment in the list based on criteria. As noted above, the criteria can include the amount of power capacity available at the candidate power sourcing equipment, amount of ports available at the candidate power sourcing equipment, the location of the candidate power sourcing equipment, or the like. Further the list or the filtered list can be prioritized (at 508). Scores can be assigned to candidate power sourcing equipment based on how well it fits into the criteria. For example, greater additional power capacity available can result in a greater score, greater amount of available ports may result in a greater score, the closer the location of the candidate is to a location of a link to one or more of the powered device can result in a greater score, etc. Then the scores are ordered. Different methods of scoring and/or ranking can be used to determine the more beneficial candidates during the prioritization process.

Then, at 510, the filtered and/or prioritized candidate list is presented to a user (e.g., a network administrator). The presentation can be in any manner of communication, such as display, audible output, or the like. The user may then use the candidate list to deploy or redeploy one or more network powered devices. At 512, the method 500 ends.

FIG. 6 is a flowchart of a method for generating a notification to redeploy network powered devices, according to one example. Although execution of method 600 is described below with reference to network management device 200, other suitable components for execution of method 600 can be used. Additionally, the components for executing the method 600 may be spread among multiple devices. Method 600 may be implemented in the form of executable instructions stored on a machine-readable storage medium and/or in the form of electronic circuitry.

Method 600 can start at 602 in a state where a network management device 200 is requested to redeploy powered devices powered by a power sourcing equipment (e.g., PSE 110n). The request can come from an administrator or be triggered by another process of the network management device 200. At 604, the redeployment module 218 determines a set of one or more powered devices 120 associated with the PSE 110n. The powered devices 120 of the set can be considered potential victim powered devices to redeploy to other power sourcing equipment 110. The set can initially start with each of the powered devices connected to the PSE 110n. The network management device 200 can receive information about the powered devices from the PSE 110n or can include a running memory and/or mapping data structure that is updated when a powered device is deployed or redeployed.

Then, at 606, the filtering module 216 filters the potential victim powered devices based on criteria. As noted previously, the criteria can include the amount of power consumed by the powered devices, similarities of the potential victim powered devices and powered devices of potential power sourcing equipment where the victim powered devices will be redeployed, impact of downtime, or combinations thereof. Further, the network management device 200 can prioritize the potential victims.

A notification module 220 of the network management device 200 generates a notification to redeploy the victim powered devices (at 608). The notification can include the set, filtered set, prioritized set, or a combination thereof as victims to select to redeploy. Further, the notification can be in the form of any data structure or textual information utilized to convey the victim powered devices of the set or filtered set. The notification is then presented to a user (e.g., administrator) of the network management device 200 or another device of the network system (at 610). The presentation can be in any manner of communication, such as display, audible output, or the like. Then at 612, the method 600 stops.

The network administrator can utilize the presented information to redeploy one or more of the victim powered devices to other power sourcing equipment 110. Redeploying of the powered device can be accomplished by removing a network link connecting the victim powered device to the PSE 110*n* and connecting the network link from the victim powered device to one of the other power sourcing equipment 110. The physical network connection can be replaced and/or extended to connect the victim powered device to the other power sourcing equipment 110.

Figure 7:
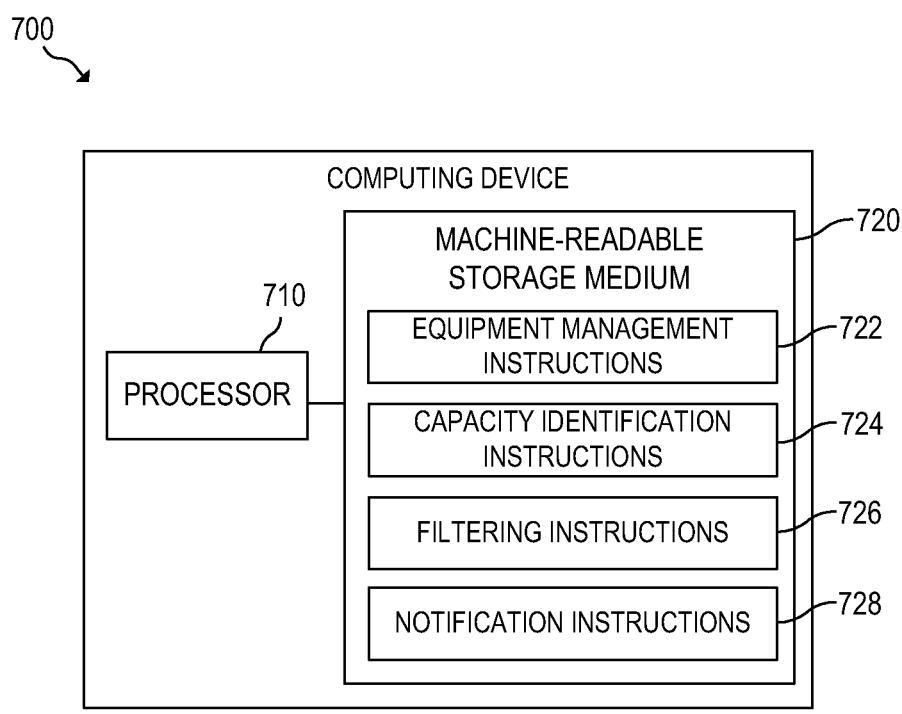
FIG. 7 is a block diagram of a computing device for managing the deployment of network power sourcing equipment, according to one example.

FIG. 7 is a block diagram of a computing device for managing the deployment of network power sourcing equipment, according to one example. The computing device 700 includes, for example, a processor 710, and a machine-readable storage medium 720 including instructions 722, 724, 726, 728 for managing deployment of network power sourcing equipment. Computing device 700 may be, for example, a server, a workstation, a notebook computer, a slate computing device, a portable reading device, a wireless email device, a mobile phone, or any other computing device.

Processor 710 may be, at least one CPU, at least one semiconductor-based microprocessor, at least one graphics processing unit (GPU), other hardware devices suitable for retrieval and execution of instructions stored in machine-readable storage medium 720, or combinations thereof. For example, the processor 710 may include multiple cores on a chip, include multiple cores across multiple chips, multiple cores across multiple devices (e.g., if the computing device 700 includes multiple node devices), or combinations thereof. Processor 710 may fetch, decode, and execute instructions 722, 724, 726, 728 to implement the methods of FIGS. 3-6. As an alternative or in addition to retrieving and executing instructions, processor 710 may include at least one integrated circuit (IC), other control logic, other electronic circuits, or combinations thereof that include a number of electronic components for performing the functionality of instructions 722, 724, 726, 728.

Machine-readable storage medium 720 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 720 can be non-transitory. As described in detail below, machine-readable storage medium 720 may be encoded with a series of executable instructions for managing a system in which network power sourcing equipment provides power to powered devices via network links.

Equipment management instructions 722, when executed by the processor 710, can control the computing device 700 to monitor and/or direct deployment of powered devices to power sourcing equipment. As such, the equipment management instructions 722 can cause the computing device 700 to receive status information associated with the power sourcing equipment. For example, computing device 700 can poll the power sourcing equipment for information. Using this information, the equipment management instructions 722 can cause the processor 710 to determine when one of the power sourcing equipment is oversubscribed as detailed above.

When it is determined that the power sourcing equipment is oversubscribed, the capacity identification instructions 724 may cause the processor 710 to identify one or more candidate power sourcing equipment that have excess capacity to power one or more powered devices currently being powered by the oversubscribed power sourcing equipment. If more than one other power sourcing equipment is identified, the filtering instructions 726 can cause the processor 710 to filter the set of candidate power sourcing equipment, for example, as detailed above in the description of FIG. 5. Notification instructions 728 then cause the processor 710 to generate a notification to communicate to a user or administrator of the system. With this information, the user or administrator can redeploy one or more of the powered devices associated with the oversubscribed power sourcing equipment at one of the candidate power sourcing equipment.

What is claimed is:

1. A network management device comprising:
   a receiver to receive status information about a plurality of power sourcing equipment, each power sourcing equipment to provide power to a plurality of powered devices via respective network connections;
   an equipment manager module to determine a first power sourcing equipment, from among the plurality of power sourcing equipment, that is at or approaching its power sourcing capacity;
   a capacity identifier module to determine a second power sourcing equipment whose power sourcing capacity is below a threshold; and
   a redeployment module to select one or more of the powered devices to be redeployed from being powered by the first power sourcing equipment to being powered by the second power sourcing equipment based on criteria.

2. The network management device of claim 1,
   wherein the status information received from each respective power sourcing equipment includes a used power consumption level associated with the respective power sourcing equipment, and
   wherein the equipment manager module is to determine the first power sourcing equipment based on the used power consumption level meeting or exceeding a threshold power capacity.

3. The network management device of claim 2,
   wherein the equipment manager module maintains a count of how many times the used power consumption level meets or exceeds the threshold power capacity,
   wherein the equipment manager module determines the first power sourcing equipment based on a comparison of the count to a violation threshold.

4. The network management device of claim 1,
   wherein the capacity identifier module determines a set of the power sourcing equipment, based on the status information, with the excess power capacity, and
   wherein the set includes the second power sourcing equipment.

5. The network management device of claim 4, further comprising:
   a filtering module to filter the set based on respective spatial relationships between the first power sourcing equipment and the respective power sourcing equipment of the set,
   wherein the filtered set includes the second power sourcing equipment.

6. The network management device of claim 4, further comprising:
   a filtering module to filter the set based on a quantity of the excess power capacity of the respective power sourcing equipment,
   wherein the filtered set includes the second power sourcing equipment.
7. The network management device of claim 4, further comprising:
   a filtering module to filter the set based on a type of powered devices provided power by the respective power sourcing equipment,
   wherein the filtered set includes the second power sourcing equipment.
8. A method comprising:
   receiving status information about a plurality of power sourcing equipment, each power sourcing equipment to provide power to a plurality of powered devices via respective network connections;
   determining that power usage of a first power sourcing equipment of the plurality of power sourcing equipment providing power to the plurality of powered devices via the network connection, is at or approaching its power sourcing capacity based on the status information;
   identifying a second power sourcing equipment with excess capacity to provide power; and
   selecting, based on criteria, one or more of the powered devices to be redeployed from the first power sourcing equipment to the second power sourcing equipment.
9. The method of claim 8, further comprising:
   receiving status information from the second power sourcing equipment,
   wherein the status information includes a power level available value and a consumed power level; and
   determining that the second power sourcing equipment has the excess capacity based on the power level available value and the consumed power level.
10. The method of claim 9,
   wherein the status information further includes a number of available network connection ports of the second power sourcing equipment,
   wherein the excess capacity is further based on the number of available network connection ports.
11. The method of claim 8, further comprising:
   determining a spatial relationship between the first power sourcing equipment and the second power sourcing equipment,
   wherein the identification is further based on the spatial relationship.
12. A system comprising:
   a plurality of network elements;
   a plurality of network powered devices,
   wherein the network elements respectively provide power to a subset of the network powered devices via respective network connections; and
   a network management device comprising:
      a receiver to receive status information about the plurality of network elements;
      an equipment manager module to determine a network element, from among the plurality of network elements, that is at or approaching its power sourcing capacity based on the status information;
      a capacity identifier module to determine a list of the network elements with a power supply usage below a threshold level; and
      a redeployment module to select, based on criteria, one or more of the powered devices to be redeployed from being powered by a first power sourcing equipment to being powered by a second power sourcing equipment included in the list.
13. The system of claim 12,
   wherein the network management device further comprises:
      a filtering module to filter the list based on at least one of: spatial criteria, capability criteria, and utilization criteria.
14. The system of claim 12, further comprising:
   wherein the determination of the list is triggered based on a determination by the equipment manage module that a used power consumption level in one of the network elements is at or approaching its power sourcing capacity, and
   wherein the subset of the network powered devices associated with the one network element includes the other network powered device.

* * * * *